United States Patent
Halageri (10) Patent No.: US 11,928,022 B2
(45) Date of Patent: *Mar. 12, 2024

(54) INTRODUCTION AND DETECTION OF PARITY ERROR IN A UART

(71) Applicant: Microchip Technology Incorporated, Chandler, AZ (US)

(72) Inventor: Avinash Halageri, Karnataka (IN)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,277

(22) Filed: May 26, 2022

(65) Prior Publication Data

US 2023/0011127 A1    Jan. 12, 2023

(51) Int. Cl.
*G06F 11/10*    (2006.01)
*G06F 11/07*    (2006.01)

(52) U.S. Cl.
CPC ........ *G06F 11/102* (2013.01); *G06F 11/0772* (2013.01); *G06F 11/0784* (2013.01)

(58) Field of Classification Search
None
See application file for complete search history.

(56) References Cited

U.S. PATENT DOCUMENTS

| | | | | |
|---|---|---|---|---|
| 4,949,333 A * | 8/1990 | Gulick | ............... | H04Q 11/0428 370/282 |
| 6,883,132 B1 * | 4/2005 | Dotson | ................. | H03M 13/09 714/774 |
| 7,010,612 B1 * | 3/2006 | Si | ............................. | H04L 7/04 709/248 |
| 8,117,587 B1 * | 2/2012 | Testardi | ............. | G06F 11/3664 717/100 |
| 2006/0101317 A1 | 5/2006 | Uemura et al. | ................ | 714/746 |
| 2008/0084947 A1 * | 4/2008 | Shih | ...................... | G06F 13/385 375/340 |
| 2019/0227121 A1 | 7/2019 | Azam et al. | | |
| 2021/0200615 A1 | 7/2021 | Aune | | |

OTHER PUBLICATIONS

International Search Report and Written Opinion, Application No. PCT/US2022/035215, 14 pages.

* cited by examiner

*Primary Examiner* — Guerrier Merant
(74) *Attorney, Agent, or Firm* — SLAYDEN GRUBERT BEARD PLLC (57) ABSTRACT

A UART includes a transmission register, a receive register, a virtual remappable pin, a parity error check circuit to evaluate contents of the receive register for a parity error, and control logic to determine contents of the transmission register. The contents include underlying data and a parity bit based thereupon. The control logic is to route the contents through the first virtual remappable pin to the receive register. The control logic is to, before reception of the entire contents at the receive register, cause modified contents to be provided to the receive register. The modified contents are to cause a parity error. The modified contents are to include different underlying data or a different parity bit than the contents of the transmission register. The control logic is to determine whether the parity error check circuit detected the parity error.

33 Claims, 4 Drawing Sheets

INTRODUCTION AND DETECTION OF PARITY ERROR IN A UART

PRIORITY

This application claims priority to Indian application No. 202111030809 filed Jul. 9, 2021. The present application relates to electronic communication and, more particularly, to introduction and detection of parity error in a single universal asynchronous receiver/transmitter (UART).

FIELD OF THE INVENTION

The present application relates to electronic communication and, more particularly, to introduction and detection of parity error in a single universal asynchronous receiver/transmitter (UART).

BACKGROUND

UARTs are used to implement a variety of communication protocols between electronic devices. UARTs may be used for serial communications. The transmission of data by a UART may be framed by start and stop bits in order to facilitate timing between UARTs on different devices.

Different errors may occur in data transmission between UARTs. Such errors may occur from, for example, noise in the sending device, transmission medium, receiving device, or misconfiguration of one of these elements. One such error may include a parity error. A parity error may arise from a bit of data changing its value during transmission. A parity error may be detected by a parity check. A parity check may be performed, in part, by evaluation of a parity bit. The parity bit may be an indication of whether in a given frame the total count of bits that have a given value—such as zero or one—are even or odd. The parity bit may be set by the sending UART based upon the data to be sent and included in or appended to the frame of the data. The receiving UART may calculate what the parity bit should be based upon the data that was actually received, and then compare the calculated parity bit with the parity bit that was received from the sending UART. If the calculated parity bit does not match the received parity bit, then a parity error has occurred.

Inventors of examples of the present disclosure have discovered that tests of UART circuits, devices, and modules often use two or more such UART circuits, devices, or modules. Data is generated by one such UART and received by the other such UART. In order to test the correctness of operation, such as detection of parity errors, a parity error may be artificially created. However, by using a separate UART circuit, device, or module, which may in turn be on a separate microcontroller or system from the original UART circuit, device, or module, inventors of examples of the present disclosure have discovered that this dependence on another UART circuit, device, or module may cause additional errors. Such additional errors may include false positive or false negative results from testing the UART's parity error capabilities. For example, data may be sent from a sending UART to a receiving UART. Test mechanisms in the sending UART may introduce a parity error by, for example, switching a bit of the data to be sent. However, this error may go undetected if, for example, another bit of the data to be sent is switched by noise in the transmission medium or in the receiving UART. In a test or validation of the UARTs, it may appear that the parity error checking is working correctly, even though such parity error checking is not working correctly. Moreover, it may not be clear whether parity error checking of the sending UART is not working correctly, parity error checking of the receiving UART is not working correctly, or if noise is present in the sending UART, transmission medium, or receiving UART. Inventors of examples of the present disclosure have discovered that the examples of the present disclosure address one or more of these issues.

SUMMARY

A UART includes a transmission register, a receive register, a virtual remappable pin, a parity error check circuit to evaluate contents of the receive register for a parity error, and control logic to determine contents of the transmission register. The contents are to include underlying data and a parity bit based on the underlying data. The control logic is to route the contents of the transmission register through the virtual remappable pin to the receive register. The control logic is to, before reception of the entire contents of the transmission register at the receive register, cause modified contents to be provided to the receive register. The modified contents are to cause a parity error. The modified contents are to include different underlying data or a different parity bit than the contents of the transmission register. The control logic is to determine whether the parity error check circuit detected the parity error.

DETAILED DESCRIPTION

Examples of the present disclosure may include a UART. The UART may include a transmission register, a receive register, a virtual remappable pin, a parity error check circuit, and control logic. The UART may be to work in a normal mode and in a test mode. In the normal mode, the UART may transmit or receive data on behalf of other elements that use the UART for communication, such as a system or microcontroller into which the UART is included or is integrated. In a test mode, the UART may perform a self-test to verify that the parity error check circuit is working correctly. The mode of operation may be controlled by the control logic.

The transmission register and receive register may include any suitable mechanism for storing information, such as a hardware register, volatile memory, or non-volatile memory. The transmission register and receive register may each be local to the UART, as opposed to a general-purpose register for a larger microcontroller into which the UART is integrated or implemented. The transmission register may be to include information to be transmitted by the UART. Data for the transmission register may be provided by, for example, elements of a system using the UART for communication in the normal mode. Such data may be provided by, for example, the control logic in the test mode. The receive register may be to include information received by the UART. Data for the receive register may be provided by, for example, other elements of a system in communication with the UART in the normal mode, such as a different UART. Such data may be provided by, for example, test circuitry as described below in the test mode.

The virtual remappable pin may be implemented in any suitable manner. In one example, the virtual remappable pin may be implemented by a software-controlled interconnect matrix. The matrix may be implemented wholly within the UART, or within the UART and a larger system in which the UART resides such as a microcontroller. The virtual remappable pin may be programmable through the control logic. The control logic may in turn make programmatic calls to other parts of the system to set the virtual remappable pin. The virtual remappable pin may be programmable to tie two ports of the UART, or the system in which the UART is implemented, together. The virtual remappable pin may be used to tie, for example, TX and RX ports together, or an RX port to a ready to send port.

The parity error check circuit may be to evaluate contents of the receive register for a parity error. The parity error check circuit may evaluate the parity of the contents of the receive register against an expected parity. The expected parity may be calculated by a parity error check circuit based upon the data contents. In a normal mode, the parity bit may be set correctly when contents are placed into a transmission register and sent to another UART. The contents of the transmission may be corrupted during transmission and thus the contents as received at the receive register may fail the parity error check. In the test mode, the control logic, as described below, may artificially cause a parity error that should be detected by the parity error check circuit. The test mode may thus test whether the parity error check circuit is working correctly.

The control logic may be to, in a test mode, determine or set contents of the transmission register. The contents may include underlying data and a parity bit based on the underlying data. The control logic may be to, in a test mode, route the contents of the transmission register through the virtual remappable pin to the receive register. The control logic may be to, in a test mode, before reception of the entire contents of the transmission register at the receive register, cause modified contents to be provided to the receive register. The modified contents may cause a parity error. The modified contents may include different underlying data or a different parity bit than the contents of the transmission register. The control logic may be to, in a test mode, determine whether the parity error check circuit detected the parity error.

The control logic and parity error check circuit may be implemented in any suitable manner, such as by analog circuitry, digital circuitry, an application specific integrated circuit, field programmable gate array, reconfigurable or programmable hardware, instructions for execution by a processor, or any suitable combination thereof.

In combination with any of the above examples, the control logic may be to cause modified contents to be provided to the receive register before reception of the entire contents of the transmission register at the receive register by routing a known signal to the receive register through the virtual remappable pin.

In combination with any of the above examples, the known signal may be a constant value.

In combination with any of the above examples, the constant value may be equal to an expected value of a stop bit.

In combination with any of the above examples, the contents may include the stop bit, and the control logic may be to cause modified contents to be provided to the receive register. The modified contents may include setting different underlying data or different parity bit of the transmission register and setting the expected value of the stop bit, through application of the known signal.

In combination with any of the above examples, the known signal may be a ready-to-send signal.

In combination with any of the above examples, the known signal may be a data terminal ready signal.

In combination with any of the above examples, the control logic may be to cause modified contents to be provided to the receive register by switching input signals to the receive register from the contents of the transmission register to the known signal.

In combination with any of the above examples, the control logic may be to cause modified contents to be provided to the receive register through a remapping of the virtual remappable pin from the contents of the transmission register to a known signal.

In combination with any of the above examples, the control logic may be to cause modified contents to be provided to the receive register by selectively routing inputs to the receive register.

In combination with any of the above examples, the control logic may be to, based upon a determination that the parity error check circuit failed to detect the parity error, issue an error signal to indicate a failure to detect the parity error. Any suitable error signal may be used.

Examples of the present disclosure may include a microcontroller. The microcontroller may include any of the UARTs of the above examples.

Figure 1:
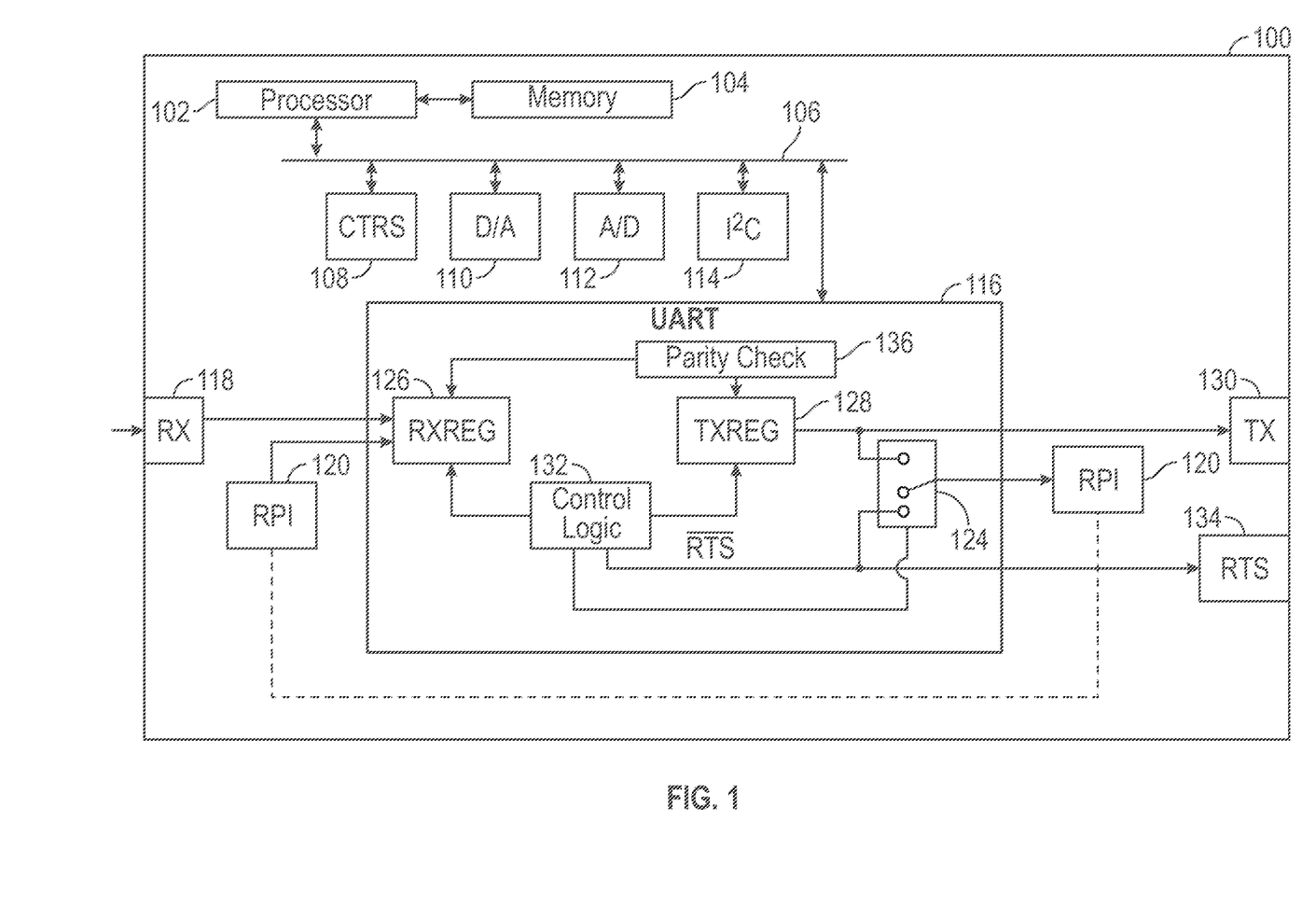
FIG. 1 is an illustration of an example system for introduction and detection of parity error in a UART, according to examples of the present disclosure.

FIG. 1 is an illustration of an example system 100 for introduction and detection of parity error in a UART, such as a single UART, according to examples of the present disclosure. System 100 may be implemented within any suitable context, such as within a controller, microcontroller, die, integrated circuit, system on a chip, application specific integrated circuit, field programmable gate array, computer, mobile device, or any other suitable electronic device. In the example of FIG. 1, system 100 may be implemented by a microcontroller.

System 100 may include a UART 116. UART 116 may be implemented by analog circuitry, digital circuitry, instructions for execution by a processor, or any suitable combination thereof. System 100 may include more instances of UART 116 than are shown. However, a single such UART 116 may be configured to introduce and detect a parity error. In the case of multiple instances of UART 116, each of the multiple instances of UART 116 may introduce and detect a respective parity error.

System 100 may include any suitable external ports, such as TX port 130, RX port 118, and a ready to send (RTS) port 134, for providing communication to or from UART 116. RTS port 134 may be a logic low port, such that an RTS signal is "true" when a zero or other logic low value. Such ports 130, 118, 134 may be implemented by any suitable electrical connection. In various examples, ports 130, 118, 134 may be external connections of a die, board, chip, or other packaging of UART 116. Ports 130, 118, 134 may be configured to provide communication between UART 116 and other instances of UARTs on other devices.

System 100 may include any other suitable kind and number of elements. For example, system 100 may include a processor 102 communicatively coupled to a memory 104. Memory 104 may include instructions that, when loaded and executed by processor 102, may implement software to be executed by system 100. System 100 may include a system bus 106. System bus 106 may be configured to provide communication between processor 102 and other parts of system 100, such as UART 116.

In one example, UART 116 may be a peripheral of a microcontroller of system 100. Such a peripheral may perform tasks on behalf of processor 102 and system 100. The tasks may be initiated by a command, user input, software, or other operation of processor 102. Once initiated, such tasks may be performed independently of processor 102 by the peripheral. Thus, processor 102 may offload tasks to such peripherals. When finished with a task, or upon other suitable criteria wherein processor 102 or software executing thereon is to take further action, the peripheral may, for example, generate an interrupt to processor 102. Other possible peripherals of system 100 may include, for example, counters 108, digital to analog converter 110, analog to digital converter 112, or an I2C communication circuit 114, however in some examples counters 108, digital to analog converter 110, analog to digital converter 112, or an I2C communication circuit 114 may not be included.

UART 116 may include control logic 132. Control logic 132 may be implemented by analog circuitry, digital circuitry, an application specific integrated circuit, field programmable gate array, reconfigurable or programmable hardware, instructions for execution by a processor, or any suitable combination thereof. Control logic 132 may be configured to direct and control operations of UART 116 for introducing parity errors as described in the present disclosure.

UART 116 may include a receive register such as RXREG 126. RXREG 126 may be configured to store one or more bits of information, including substantive data to be received, frame information, or error information such as parity bits, that are received at UART 116 through RX port 118. The data received on RX port 118 may be received from another instance of a UART. Data in RXREG 126 may be read and used by any suitable portion of system 100, such as by control logic 132.

UART 116 may include a transmitting register such as TXREG 128. TXREG 128 may be configured to store one or more bits of information, including substantive data to be sent, frame information, or error information such as parity bits, that are to be sent by UART 116 through TX port 130. The data to be stored in TXREG 128 and sent through TX port 130 may be generated by any suitable portion of system 100, such as by control logic 132, software executing on processor 102, or another peripheral of system 100.

In one example, UART 116 may be configured to introduce a parity error using resources available within UART 116. UART 116 may be configured to introduce a parity error without using an additional instance of a UART.

In one example, UART 116 may include or have access to one or more virtual remappable pins. For simplicity of discussion, a singe virtual remappable pin is described herein, it being understood that more than one virtual remappable pin may be provided. Such a virtual remappable pin may be configured to provide connections between or within a given peripheral of system 100, such as UART 116. The virtual remappable pin may be implemented by, for example, a switch fabric internal to UART 116 or between UART 116 and other elements of system 100. In one example, the virtual remappable pin may be implemented by a software-controlled interconnect matrix. The matrix may be implemented wholly within UART 116, or within UART 116 and a larger system in which UART 116 resides such as a microcontroller. The virtual remappable pin may be programmable through control logic 132. Control logic 132 may in turn make programmatic calls to other parts of the system to set the virtual remappable pin. The virtual remappable pin may be programmable to electrically tie, i.e., connect, two ports of UART 116 or system 100. The virtual remappable pin may be used to tie, for example, TX and RX ports or registers together, or an RX port or register to a ready to send signal. For example, UART 116 may include remappable pin RP1 120. RP1 120 is illustrated outside of UART 116 as if these were physical pins for demonstration purposes. Moreover, illustrated in FIG. 1 are two representations of remappable pin RP1 120, provided for readability. The single instance of remappable pin RP1 120 is illustrated as separate instances to show the equivalent routing of signals to or from the remappable pins, although these are a single instance. Control logic 130 may be configured to route two or more signals to a same remappable pin. This may have the effect of connecting the two or more signals. This may occur within UART 116 or within system 100. The routing of signals through remappable pin RP1 120 may be performed programmatically by control logic 130 by assigning and reassigning remappable pin RP1 120. However, for the purposes of illustration, the ability of control logic 130 to route signals through remappable pin RP1 120 may be illustrated as a switch 124.

Parity information for the data to be sent to TX port 130 may be stored in TXREG 128. The parity information may be set according to a designed parity scheme for UART 116. Any suitable parity information may be used. For example, a parity bit may be used. In a further example, the parity bit may be set to a one if there are an odd number of one values within the data to be sent, and the parity bit may be set to a zero if there an even number of one values within the data to be sent. The examples shown in the present disclosure may follow this scheme. In other examples, the parity bit may be set to a zero if there are an odd number of one values within the data to be sent, and the parity bit may be set to a one if there an even number of one values within the data to be sent.

Parity information may be set or checked by any suitable portion of UART 116. For example, UART 116 may include a parity error check circuit 136. Parity error check circuit 136 may be implemented by analog circuitry, digital circuitry, instructions for execution by a processor, or any suitable combination thereof. In one example, parity error check circuit 136 may be configured to examine and evaluate contents of TXREG 128 and to set a parity bit in TXREG 128 based upon the underlying data to be transmitted from TXREG 128. In another example, the parity bit may be set instead by other suitable portions of UART 116, such as a source of the contents of TXREG 128. Furthermore, parity error check circuit 136 may be configured to examine and evaluate contents of RXREG 126 and evaluate whether a parity error has occurred. Parity error check circuit 136 may be configured to read the underlying data of RXREG 126, as it was actually received, and calculate a parity bit corresponding to such underlying data. Parity error check circuit 136 may be configured to compare such a calculated parity bit with the parity bit that was actually received in RXREG 126. If the parity bits do not match, then a parity error may have occurred. UART 116 may take any suitable corrective action. If the parity bits do match, a parity error has not occurred, and then UART 116 may continue to process information in RXREG 126.

During a normal mode of operation, wherein the parity error checking capabilities of UART 116 are not to be tested, remappable pin RP1 120 might not be used in the manner shown in FIG. 1. Remappable pin RP1 120 may instead be unassigned or not present, and UART 116 may be configured to route contents of TXREG 128 to TX port 130. The parity information for the data in TXREG 128 to be sent to TX port 130 may be calculated and stored in TXREG 128, or otherwise sent with the data to TX port 130. The data may be sent from TX port 130 on to other entities (not shown) connected to TX port 130, such as another UART. Furthermore, UART 116 may be configured to route contents from RX port 118 to RXREG 126. In one example RX port 118 is directly connected to an input of RXREG 126. Parity information for the data received in RXREG 126 may be calculated and compared against the parity information that arrived with the data received in RXREG 126, by parity error check circuit 136, as discussed above. If the parity information matches, then no parity error might be detected. If the parity information does not match, then a parity error might be detected. If a parity error is detected, then any suitable corrective action may be taken. These may include, for example, requesting that the sender of the information—such as another UART—resend the data, or notifying a user or software entity of system 100.

During the normal mode of operation, an RTS signal may be routed to RTS port 134 by control logic 132. The RTS signal may be part of a handshaking scheme (along with a clear to send (CTS) message). The RTS signal may signal to other UART instances (not shown) that UART 116 is ready to send. In the example of system 100, a logic low signal may indicate that UART 116 is ready to send, while a logic high signal may indicate that UART 116 is not ready to send.

Control logic 132 may be configured to switch UART 116 between test and normal modes. During a test mode, control logic 132 may be configured to determine example test contents to be used in TXREG 128. Control logic 132 may make this determination by generating the test contents or evaluating the contents in TXREG 128 that may have been provided by another entity.

During a test mode, control logic 132 may be configured to selectively route contents of TXREG 128 through remappable pin RP1 120 to RXREG 126. Control logic 132 may be configured to perform such routing in any suitable manner. Control logic 132 may be configured to selectively route other contents to RXREG 126 to cause modified contents, when compared to the original contents of TXREG 128, to be provided to RXREG 126. The modified contents may be provided to RXREG 126 before the entire original contents of TXREG 128 are provided to RXREG 126, i.e., a portion of the entire original contents of TXREG 128 may not be provided to RXREG 126 and instead the portion may be replaced with a modified contents. The modified contents may be configured to cause a parity error in RXREG 126. The modified contents may include a different parity bit than what was originally in TXREG 128, or different underlying data than what was originally in TXREG 128, or both.

In one example, remappable pin RP1 120 may be reprogrammed during transmission of contents of TXREG 128 to route the RTS signal to the input of RXREG 126 before the entire original contents of TXREG 128 are provided to RXREG 12. This operation is shown symbolically as a switch 124 in FIG. 1. Control logic 132 may be configured to selectively apply either the RTS signal output through remappable pin RP1 120 to RXREG 126 or the contents of TXREG 128 through remappable pin RP1 120 to RXREG 126. The selective application may be performed by reprogramming RP1 120 from connecting TXREG 128 and RXREG 126 to connecting the RTS signal output of control logic 130 and RXREG 126. The reprogramming of RP1 120 to connect the RTS signal output of control logic 130 and RXREG 126 may cause bits to be switched, inserted, or otherwise manipulated to artificially create a parity error in the contents of RXREG 126.

Any suitable bit in the transmission of information in a frame between TXREG 128 and RXREG 126 may be changed by control logic 132 to artificially create a parity error. For example, a bit in the underlying data that was a logic low value in the contents of TXREG 128 may be changed to a logic high value. In another example, a bit in the underlying data that was a logic high value in the contents of TXREG 128 may be changed to a logic low value. In these examples, the underlying data in the contents of TXREG 128 may have caused a certain parity bit to be set, and the action of control logic 132 to artificially change a bit of such underlying data should cause the parity calculation of RXREG 126 to not match the parity bit that was sent. Parity error check circuit 136, if working correctly, may detect this parity error. Control logic 132 may be configured to determine if the parity error was correctly determined by the parity error check circuit 136.

In yet another example, the parity bit itself that was a logic low value in the contents of TXREG 128 may be changed to a logic high value by control logic 132 to check the operation of parity error check circuit 136. In still yet another example, the parity bit itself that was a logic high value in the contents of TXREG 128 may be changed to a logic low value by control logic 132 to check the operation of parity error check circuit 136. In these examples, the underlying data in the contents of TXREG 128 may have caused a certain parity bit value to be set, and the action of control logic 132 to artificially change this value should cause the parity calculation of parity error check circuit 136 to not match the parity bit that was sent. Parity error check circuit 136, if working correctly, may detect this parity error. Control logic 132 may be configured to determine if the parity error was correctly determined by the parity error check circuit 136.

Control logic 132 may be configured to utilize any suitable source of information to set the incorrect value for the parity bit provided to RXREG 126 through remappable pin RP1 120. In one example, control logic 132 may be configured to provide the RTS signal as the source of information to set the incorrect value for the parity bit provided to RXREG 126 through remappable pin RP1 120. The RTS signal, as discussed above, may be a logic low when UART 116 is read to send data. However, as UART 116 is set into a test mode, the RTS signal may be a logic high, indicating that UART 116 is not ready to send data. Thus, in the test mode, control logic 132 may utilize the status of the RTS signal to send a logic high value into RXREG 126. Although the use of the RTS signal is described as being used in order to create a parity error in the contents of RXREG 126, any suitable signal may be used.

An RTS signal may be used because its value, when data is not ready to send because the test mode is activated, is known to be a logic high value. This logic high value corresponds to the value for an expected stop bit, which would also be a logic high. Thus, in the test mode, the RTS signal may be reliably a logic high value and successfully applied to alter the underlying data or the parity bit of the contents of TXREG 128 as received by RXREG 126. By aligning such a modified value (e.g., the RTS signal) as received by RXREG 126 to be the same value as expected for a stop bit, a second modification to make the modified value match the expected value of the stop bit. Without the expected value of the stop bit being provided by, for example, the RTS signal, parity error check circuit 136 might not attempt to check the parity of the contents of RXREG 126, as a different transmission error may be caused by an incorrect stop bit value and preempt the parity check. As indicated above, while an RTS signal is used, any suitable known signal may be used. The suitable known signal may be a constant value for the duration of the application of the known signal to RXREG 126 in place of contents transmitted from TXREG 128, and of a value matching the expected value of the stop bit. For example, a data terminal ready signal may be used instead of an RTS signal. A known signal may be inverted, if necessary, to conform to an expected value of a stop bit.

The test mode may be used on the basis of any suitable criteria. For example, the test mode may be performed upon startup of system 100, periodically, as part of a larger diagnostic test, or on demand by a user or software of system.

Figure 2:
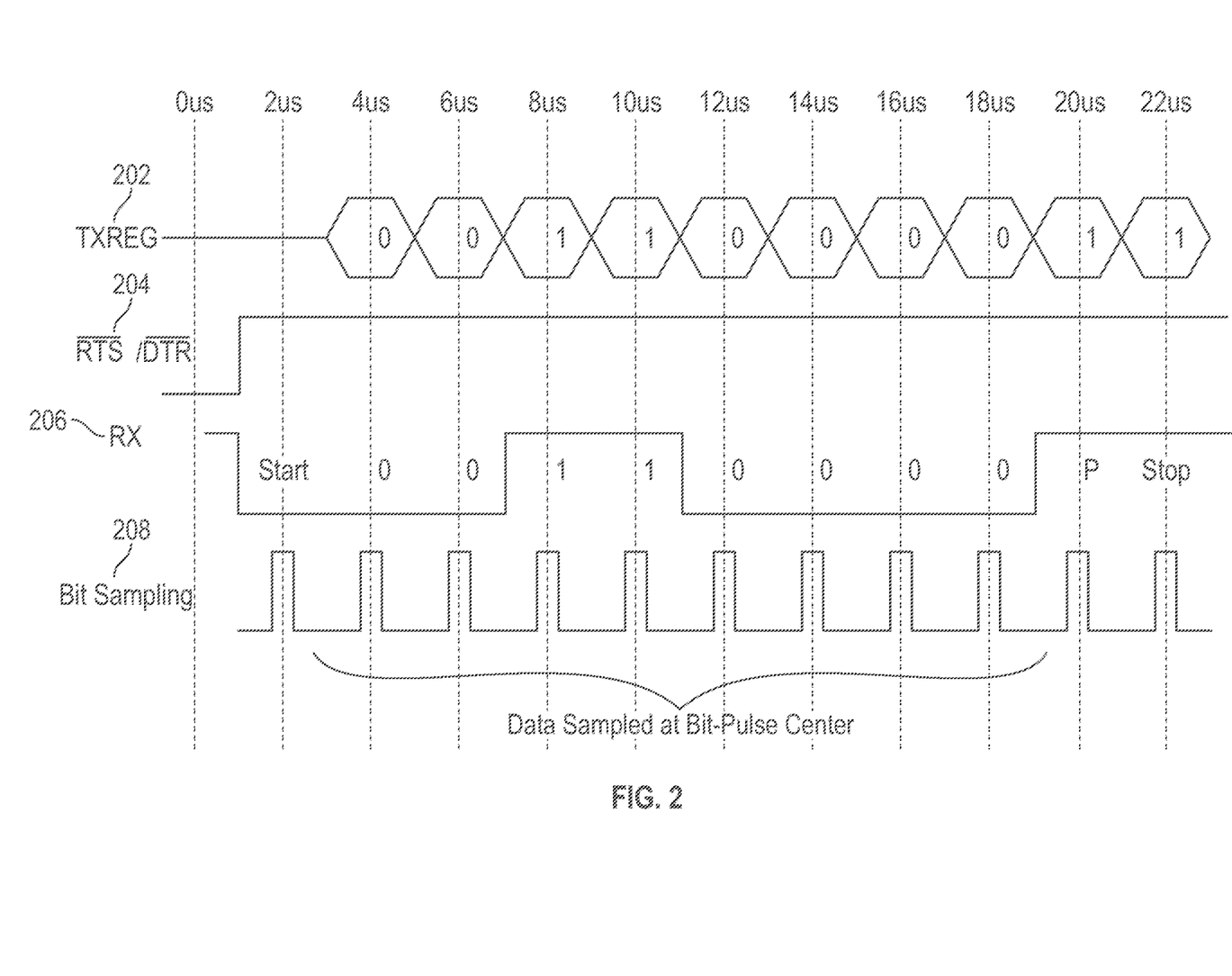
FIG. 2 is a timing diagram of generation of parity checking information, according to examples of the present disclosure.

FIG. 2 is a timing diagram of generation of parity checking information, according to examples of the present disclosure. The diagrams of FIG. 2 may reflect a correct frame of information with a correct parity bit as tested during a test mode. The data shown in FIG. 2 may reflect the contents of TXREG 128, which may be generated by, for example, control logic 132 or any other suitable portion of system 100.

A known data sequence may be used. For example, the sequence "00110000" may be used. In this data sequence, there may be an even number of "1" values. As such and for the purposes of this example, a parity bit of "1" may be applied to the data sequence. The data contents are shown in graph 202. The contents of TXREG 128 may be routed to remappable pin RP1 120 according to the timing shown. A parity bit and a stop bit may both be "1" values.

Graph 204 may illustrate values for the RTS signal. The RTS signal may be generated by control logic 132. In other examples, a data terminal ready (DTR) signal may be used.

Graph 206 may illustrate values received by RXREG 126. These may be the contents of graph 202 as originally transmitted.

Graph 208 may illustrate timing of when data is sampled at RXREG 126. As shown, data may be sampled every 2 microseconds.

The test mode may begin at 0 microseconds. At approximately 1 microsecond, the RTS signal may be logic high, indicating that UART 116 is not ready to send data in a normal mode. RXREG 126 may be reset. Test sampling may begin at 2 microseconds.

At 4 microseconds, the value 0 may be read from TXREG 128, output to remappable pin RP1 120, and input to RXREG 126.

At 6 microseconds, the value 0 may be read from TXREG 128, output to remappable pin RP1 120, and input to RXREG 126.

At 8 microseconds, the value 1 may be read from TXREG 128, output to remappable pin RP1 120, and input to RXREG 126.

At 10 microseconds, the value 1 may be read from TXREG 128, output to remappable pin RP1 120, and input to RXREG 126.

At 12 microseconds, the value 0 may be read from TXREG 128, output to remappable pin RP1 120, and input to RXREG 126.

At 14 microseconds, the value 0 may be read from TXREG 128, output to remappable pin RP1 120, and input to RXREG 126.

At 16 microseconds, the value 0 may be read from TXREG 128, output to remappable pin RP1 120, and input to RXREG 126.

At 18 microseconds, the value 0 may be read from TXREG 128, output to remappable pin RP1 120, and input to RXREG 126.

If the value of the parity bit is not changed by control logic 132 (as is the case in FIG. 2), at 20 microseconds, the value 1 may be read from TXREG 128, output to remappable pin RP1 120, and input to RXREG 126.

At 22 microseconds, a stop bit with a logic high value may be received, ending a frame of data received at RXREG 126. Subsequently, the parity bit may be checked against the received content by parity error check circuit 136. In the example of FIG. 2, the parity bit is correct. Control logic 132 may check the results of parity error check circuit 136.

Figure 3:
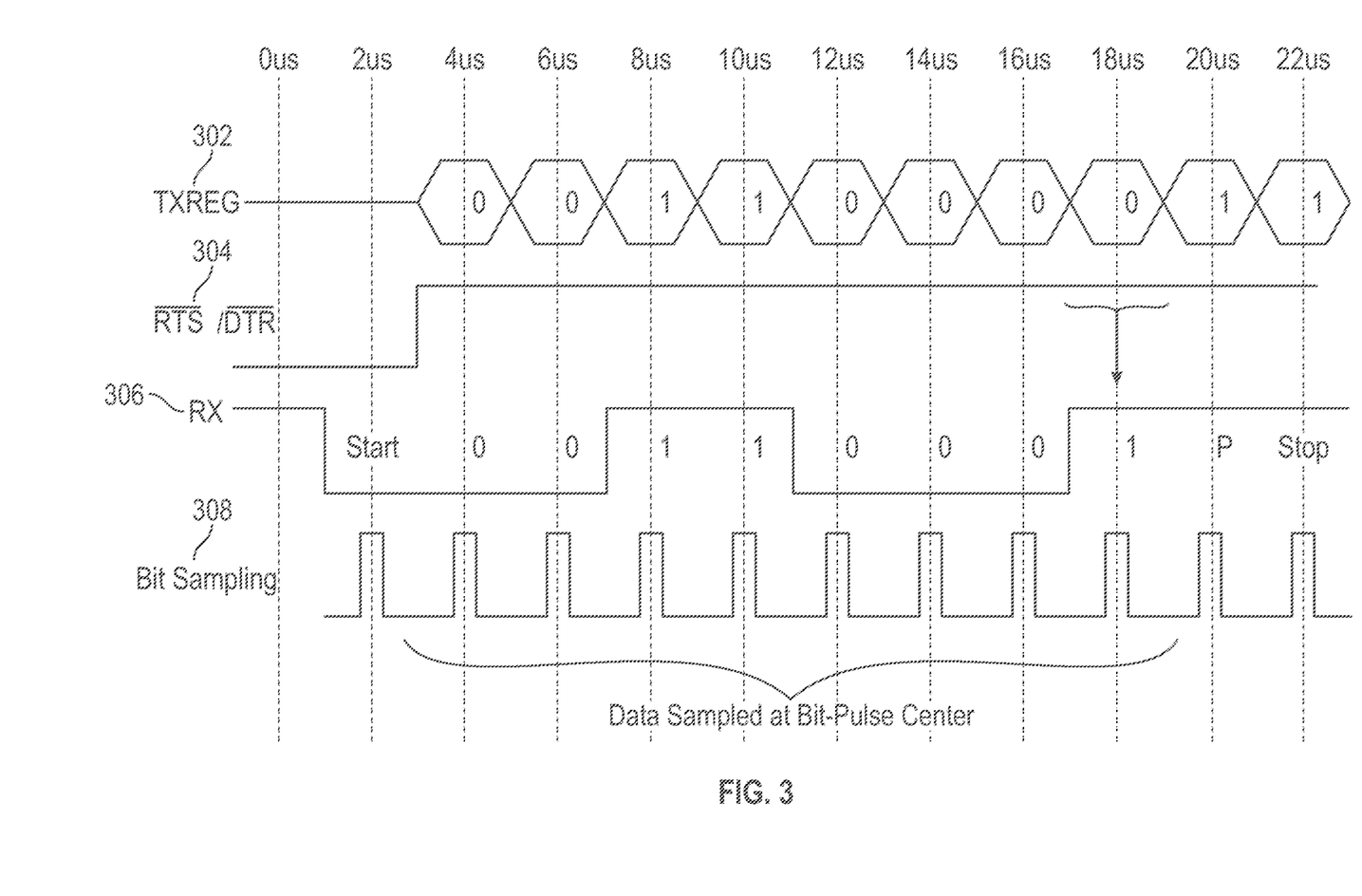
FIG. 3 is a timing diagram of introduction of parity error into the generation of parity checking information, according to examples of the present disclosure.

FIG. 3 is a timing diagram of introduction of parity error into the generation of parity checking information, according to examples of the present disclosure.

A known data sequence may be used. For example, the sequence "00110000" may be used. In this data sequence, there may an even number of "1" values and as such, for the purposes of this example, a parity bit of "1" may be applied to the data sequence. The data contents are shown in graph 302. A parity bit and a stop bit may both be "1" values.

Graph 304 may illustrate values for the RTS signal. The RTS signal may be generated by control logic 132.

Graph 306 may illustrate values received by RXREG 126. These may be the contents of graph 302, interrupted by application of the RTS signal in place of a portion of the contents of TXREG 128.

Graph 308 may illustrate that timing of when data is sampled at RXREG 126. As shown, data may be sampled every 2 microseconds.

The test mode may begin at 0 microseconds. At approximately 1 microsecond, the RTS signal may be logic high, indicating that UART 116 is not ready to send data. RXREG 126 may be reset. Test sampling may begin at 2 microseconds.

At 4 microseconds, the value 0 may be read from TXREG 128, output to remappable pin RP1 120, and input to RXREG 126.

At 6 microseconds, the value 0 may be read from TXREG 128, output to remappable pin RP1 120, and input to RXREG 126.

At 8 microseconds, the value 1 may be read from TXREG 128, output to remappable pin RP1 120, and input to RXREG 126.

At 10 microseconds, the value 1 may be read from TXREG 128, output to remappable pin RP1 120, and input to RXREG 126.

At 12 microseconds, the value 0 may be read from TXREG 128, output to remappable pin RP1 120, and input to RXREG 126.

At 14 microseconds, the value 0 may be read from TXREG 128, output to remappable pin RP1 120, and input to RXREG 126.

At 16 microseconds, the value 0 may be read from TXREG 128, output to remappable pin RP1 120, and input to RXREG 126.

At 18 microseconds, control logic 132 may be configured to cause modified contents to be provided to RXREG 126. Control logic 132 may perform this by remapping remappable pin RP1 120 to connect RXREG 126 and the RTS signal shown in graph 304. As a result, at 18 microseconds, the value 1 may be transmitted from the RTS signal, through remappable pin RP1 120 to be the input of RXREG 126. This may take the place of the value 0 of TXREG 128. In one example, as shown, remappable pin RP1 120 may be remapped to TXRED 128 and RXREG 126 after bit sampling 308 has sampled the bit for the 18 microsecond time slot. At 20 microseconds, the value 1 may be read from TXREG 128, output to remappable pin RP1 120, and input to RXREG 126. At 22 microseconds, a stop bit value 1 may be read from TXREG 128, output to remappable pin RP1 120, and input to RXREG 126, ending a frame of data received at RXREG 126. Subsequently, the parity bit may be checked against the received content by parity error check circuit 136. In the example of FIG. 3, the parity bit is incorrect. Control logic 132 may check the results of parity error check circuit 136 and confirm that parity error check circuit 136 has detected a parity error.

At 22 microseconds, a stop bit with a high logic value may be received, ending a frame of data received at RXREG 126. Subsequently, the parity bit may be checked against the received content by parity error check circuit 136. In the example of FIG. 2, the parity bit is incorrect. The parity bit had a value of one, but the data at 18 microseconds was flipped, changing the parity of the data received at RXREG 126. Control logic 132 may check the results of parity error check circuit 136 to see if this parity error has been correctly identified.

In another example, the RTS signal may continue to be mapped to remappable pin RP1 120 (and thus connected to RXREG 126) at 20 microseconds and 22 microseconds, which with the example data and parity information, may similarly result in an incorrect parity bit being received by RXREG 126, for the data actually received. Control logic 132 may check the results of parity error check circuit 136 and confirm that parity error check circuit 136 has detected a parity error. In another example, the RTS signal may continue to be mapped to remappable pin RP1 120 at 20 microseconds (and thus connected to RXREG 126), but at 22 microseconds, remappable pin RP1 120 may be remapped to TXREG 128 and RXREG 126, which with the example data and parity information, may similarly result in an incorrect parity bit being received by RXREG 126, for the data actually received. Control logic 132 may check the results of parity error check circuit 136 and confirm that parity error check circuit 136 has detected a parity error.

Figure 4:
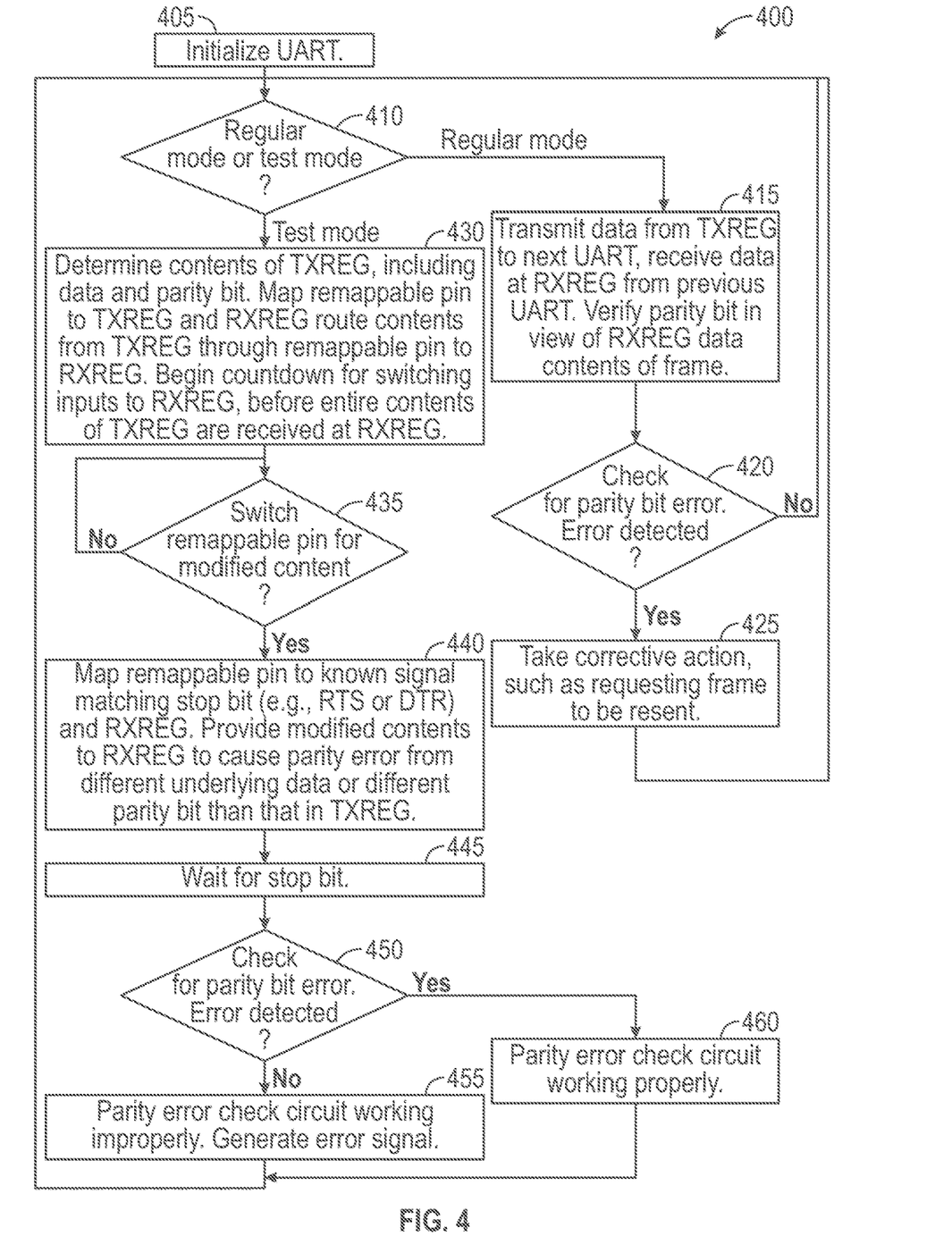
FIG. 4 is an illustration of an example method for introduction and detection of parity error in a UART, according to examples of the present disclosure.

FIG. 4 is an illustration of an example method 400 for introduction and detection of parity error in a UART, i.e., in a single UART, according to examples of the present disclosure.

Method 400 may be performed by any suitable mechanism, such as the system of FIGS. 1-3 and, in particular, control logic 132 and parity error check circuit 136. Method 400 may contain more or fewer steps than shown in FIG. 4. Moreover, various steps of method 400 may be repeated, omitted, skipped, performed in a different order, performed in parallel, or performed recursively.

At 405, a UART may be initialized.

At 410, it may be determined whether the UART is to operate in a normal mode or a test mode. The decision to enter test mode may be made on-demand by a user of the UART, periodically, at start-up, or on any other suitable basis. If the UART is to operate in normal mode, method 400 may proceed to 415. Otherwise, if the UART is to operate in test mode, method 400 may proceed to 430.

At 415, data may be transmitted from the UART to another UART, or data may be received at the UART from another UART. Data to be transmitted may be stored in the TXREG. Data received may be stored in the RXREG. Received data may be checked for parity. The parity bit received in the RXREG may be evaluated in view of the underlying data frame also received in the RXREG.

At 420, it may be determined whether there is a parity bit error. If not, method 400 may return to 410. If so, method 40 may proceed to 425.

At 425, any suitable corrective action may be taken for a parity bit, such as generating an error signal, generating an alert, or requesting the frame to be resent by the sending UART. Method 400 may return to 410.

At 430, a remappable pin may be mapped between the TXREG and the RXREG so that output of the TXREG will propagate to the RXREG. A countdown may begin until a suitable time to switch the application of the TXREG to the RXREG to the application of a known signal such as an RTS signal to the RXREG. The countdown may be monitored by, for example, a timer of clock signals, or a software counter. The switching to cause modified content to be propagated to the RXREG may be performed before the entire contents of TXREG are received at RXREG.

At 435, it may be determined whether application of the remappable pin will be switched in order to cause modified content to be propagated to the RXREG. If so, method 400 may proceed to 440. Otherwise, method 400 may repeat 435 for one or more additional clock cycles.

At 440, the remappable pin may be remapped so as to apply a known signal, which may match an expected value of the stop bit (e.g., an RTS signal or DTR signal) to the RXREG.

At 445, the system may wait for a stop bit to be propagated to the RXREG.

At 450, contents of the RXREG may be evaluated in view of a parity bit of the RXREG. A parity of the received data may be calculated and compared with received parity information. It may be determined whether a parity error has been detected. If so, method 400 may proceed to 460. Otherwise, method 400 may proceed to 455.

At 455, it may be determined that the parity error checking circuit, which performed 450, is working improperly. Any suitable corrective action, such as an alert to a user of the UART, may be performed. Method 400 may return to 410.

At 460, it may be determined that the parity error checking circuit, which performed 450, is working properly. Method 400 may return to 410.

Although examples have been described above, other variations and examples may be made from this disclosure without departing from the spirit and scope of these examples.

I claim:

1. A universal asynchronous receiver/transmitter (UART), comprising:
   a transmission register to include information capable to be transmitted by the UART to one or more first destinations outside of the UART;
   a receive register to include information capable to be received by the UART from one or more second destinations outside of the UART;
   a virtual remappable pin;
   a parity error check circuit to evaluate contents of the receive register for a parity error; and a control logic to:
  determine contents of the transmission register, the contents to include underlying data and a parity bit based on the underlying data;
  route the contents of the transmission register through the virtual remappable pin to the receive register;
  before reception of the entire contents of the transmission register at the receive register, cause modified contents to be provided to the receive register, the modified contents to cause a parity error, the modified contents to include different underlying data or a different parity bit than the contents of the transmission register; and
  determine whether the parity error check circuit detected the parity error.

2. The UART of claim 1, wherein the control logic to cause modified contents to be provided to the receive register before reception of the entire contents of the transmission register at the receive register by routing a known signal to the receive register through the virtual remappable pin.

3. The UART of claim 2, wherein the known signal is a constant value.

4. The UART of claim 3, wherein the constant value is equal to an expected value of a stop bit.

5. The UART of claim 4, wherein:
the contents include the stop bit; and
the control logic is to cause modified contents to be provided to the receive register, including setting different underlying data or different parity bit of the transmission register and setting the expected value of the stop bit, through application of the known signal.

6. The UART of claim 2, wherein the known signal is a ready-to-send signal.

7. The UART of claim 2, wherein the known signal is a data terminal ready signal.

8. The UART of claim 2, wherein the control logic is to cause modified contents to be provided to the receive register by switching input signals to the receive register from the contents of the transmission register to the known signal.

9. The UART of claim 1, wherein the control logic is to cause modified contents to be provided to the receive register through a remapping of the virtual remappable pin from the contents of the transmission register to a known signal.

10. The UART of claim 1, wherein the control logic is to cause modified contents to be provided to the receive register by selectively routing inputs to the receive register.

11. The UART of claim 1, wherein the control logic is to, based upon a determination that the parity error check circuit failed to detect the parity error, issue an error signal to indicate a failure to detect the parity error.

12. A microcontroller, comprising:
a universal asynchronous receiver/transmitter (UART), a transmission register to include information capable to be transmitted by the UART to one or more first destinations outside of the UART;
a receive register to include information capable to be received by the UART from one or more second destinations outside of the UART;
a virtual remappable pin;
a parity error check circuit to evaluate contents of the receive register for a parity error; and
a control logic to:
  determine contents of the transmission register, the contents to include underlying data and a parity bit based on the underlying data;
  route the contents of the transmission register through the virtual remappable pin to the receive register;
  before reception of the entire contents of the transmission register at the receive register, cause modified contents to be provided to the receive register, the modified contents to cause a parity error, the modified contents to include different underlying data or a different parity bit than the contents of the transmission register; and
  determine whether the parity error check circuit detected the parity error.

13. The microcontroller of claim 12, wherein the control logic is to cause modified contents to be provided to the receive register before reception of the entire contents of the transmission register at the receive register by routing a known signal to the receive register through the virtual remappable pin.

14. The microcontroller of claim 13, wherein the known signal is a constant value.

15. The microcontroller of claim 14, wherein the constant value is equal to an expected value of a stop bit.

16. The microcontroller of claim 15, wherein:
the contents include the stop bit; and
the control logic is to cause modified contents to be provided to the receive register and set the expected value of the stop bit through application of the known signal.

17. The microcontroller of claim 13, wherein the known signal is a ready-to-send signal.

18. The microcontroller of claim 13, wherein the known signal is a data terminal ready signal.

19. The microcontroller of claim 13, wherein the control logic is to cause modified contents to be provided to the receive register by switching input signals to the receive register from the contents of the transmission register to the known signal.

20. The microcontroller of claim 12, wherein the control logic is to cause modified contents to be provided to the receive register through a remapping of the virtual remappable pin from the contents of the transmission register to a known signal.

21. The microcontroller of claim 12, wherein the control logic is to cause modified contents to be provided to the receive register by selectively routing inputs to the receive register.

22. The microcontroller of claim 12, wherein the control logic is to, based upon a determination that the parity error check circuit failed to detect the parity error, issue an error signal to indicate a failure to detect the parity error.

23. A method, comprising, in a universal asynchronous receiver/transmitter (UART):
determining contents of a transmission register, the transmission register to include information capable to be transmitted by the UART to one or more first destinations outside of the UART, the contents to include underlying data and a parity bit based on the underlying data;
routing the contents of the transmission register through a virtual remappable pin to a receive register capable of receiving information from one or more second destinations outside of the UART;
before reception of the entire contents of the transmission register at the receive register, causing modified contents to be provided to the receive register, the modified contents including different underlying data or a different parity bit than the contents of the transmission register, the modified contents to cause a parity error; and determining whether a parity error check circuit detected a parity error in the receive register.

24. The method of claim 23, comprising causing modified contents to be provided to the receive register before reception of the entire contents of the transmission register at the receive register by routing a known signal to the receive register through the virtual remappable pin.

25. The method of claim 24, wherein the known signal is a constant value.

26. The method of claim 25, wherein the constant value is equal to an expected value of a stop bit.

27. The method of claim 26, wherein:
the contents include the stop bit; and
the method comprises causing modified contents to be provided to the receive register and setting the expected value of the stop bit through application of the known signal.

28. The method of claim 24, wherein the known signal is a ready-to-send signal.

29. The method of claim 24, wherein the known signal is a data terminal ready signal.

30. The method of claim 24, comprising causing modified contents to be provided to the receive register by switching input signals to the receive register from the contents of the transmission register to the known signal.

31. The method of claim 23, comprising causing modified contents to be provided to the receive register through a remapping of the virtual remappable pin from the contents of the transmission register to a known signal.

32. The method of claim 23, comprising causing modified contents to be provided to the receive register by selectively routing inputs to the receive register.

33. The method of claim 23, comprising, based upon a determination that the parity error check circuit failed to detect the parity error, issuing an error signal to indicate a failure to detect the parity error.

* * * * *

UNITED STATES PATENT AND TRADEMARK OFFICE
CERTIFICATE OF CORRECTION

PATENT NO. : 11,928,022 B2
APPLICATION NO. : 17/825277
DATED : March 12, 2024
INVENTOR(S) : Avinash Halageri It is certified that error appears in the above-identified patent and that said Letters Patent is hereby corrected as shown below:

On the Title Page

Add item (30):
(30) Foreign Application Priority Data July 9, 2021 (IN) 202111030809

Signed and Sealed this
Ninth Day of April, 2024

Katherine Kelly Vidal
*Director of the United States Patent and Trademark Office*